US008150327B2

United States Patent
McCoy et al.

(10) Patent No.: US 8,150,327 B2
(45) Date of Patent: Apr. 3, 2012

(54) CHANNEL SOUNDING TECHNIQUES FOR A WIRELESS COMMUNICATION SYSTEM

(75) Inventors: James W. McCoy, Austin, TX (US); Ning Chen, Austin, TX (US)

(73) Assignee: Apple Inc., Cupertino, CA (US)

( * ) Notice: Subject to any disclaimer, the term of this patent is extended or adjusted under 35 U.S.C. 154(b) by 1353 days.

(21) Appl. No.: 11/688,093

(22) Filed: Mar. 19, 2007

(65) Prior Publication Data
US 2008/0232234 A1    Sep. 25, 2008

(51) Int. Cl.
*H04B 7/00*    (2006.01)
(52) U.S. Cl. ..................... 455/67.11; 370/203
(58) Field of Classification Search .................. 370/203; 455/67.1, 452.1
See application file for complete search history.

(56) References Cited

U.S. PATENT DOCUMENTS

| 6,031,831 | A * | 2/2000 | Tan Boon et al. | 370/342 |
| 6,510,174 | B1 * | 1/2003 | Sexton et al. | 375/213 |
| 2002/0150066 | A1 * | 10/2002 | Schilling | 370/335 |
| 2003/0133415 | A1 * | 7/2003 | Kim et al. | 370/235 |
| 2005/0111492 | A1 * | 5/2005 | Kang et al. | 370/480 |
| 2005/0152480 | A1 * | 7/2005 | Chang et al. | 375/343 |
| 2005/0170781 | A1 * | 8/2005 | Jacobsen et al. | 455/67.11 |
| 2005/0180313 | A1 * | 8/2005 | Kim et al. | 370/208 |
| 2007/0060145 | A1 * | 3/2007 | Song et al. | 455/445 |
| 2008/0235314 | A1 * | 9/2008 | Lee et al. | 708/426 |

OTHER PUBLICATIONS

International Search Report and Written Opinion for correlating PCT Patent Application No. PCT/US2008/055984 dated Jul. 9, 2008.
Mark Cudak et al. IEEE C802.16m-07/058, "Combined Draft IEEE 802.16m Requirements.", Mar. 4, 2007 (http://wirelessman.org/tgm/contrib/C80216m-07_058.pdf).
KR 10-0684323 B1 (Electronics and Telecommunications Research Institute et al.) Feb. 16, 2007. See the abstract, claims 6, 7.

* cited by examiner

*Primary Examiner* — Dwayne Bost
*Assistant Examiner* — Joseph Dean, Jr.
(74) *Attorney, Agent, or Firm* — Gazdzinski & Associates, PC

(57) ABSTRACT

A technique for channel sounding in a wireless communication system includes determining respective geometries of multiple subscriber stations with respect to a serving base station. Respective time periods for sounding a channel between the multiple subscriber stations and the serving base station are then set based on the respective geometries of the multiple subscriber stations.

19 Claims, 3 Drawing Sheets

CHANNEL SOUNDING TECHNIQUES FOR A WIRELESS COMMUNICATION SYSTEM

BACKGROUND

1. Field

This disclosure relates generally to channel sounding, and more specifically, to channel sounding techniques for a wireless communication system.

2. Related Art

In general, coded orthogonal frequency division multiplexing (COFDM) systems support high data rate wireless transmission using orthogonal channels, which typically offer immunity against fading and inter-symbol interference (ISI) without requiring implementation of elaborate equalization techniques. Typically, COFDM systems split data into N streams, which are independently modulated on parallel spaced subcarrier frequencies or tones. The frequency separation between subcarriers is 1/T, where T is the COFDM symbol time duration. Each symbol may include a guard interval (or cyclic prefix) to maintain the orthogonality of the symbols. In general, COFDM systems have utilized an inverse discrete Fourier transform (IDFT) to generate a sampled (or discrete) composite time-domain signal. One undesirable attribute of COFDM systems is that they may exhibit relatively large peak-to-average power ratio (PAR), when signals from different subcarriers add constructively. A large PAR (and/or large cubic metric (CM)) is undesirable as it requires a large dynamic range for a digital-to-analog converter (DAC) implemented within a transmitter of a COFDM system. Consequently, the DAC may be used inefficiently as most subcarrier amplitudes use a fraction of the range of the DAC.

In a typical implementation, the output of the DAC is filtered before being applied to a power amplifier. As power amplifiers tend to be non-linear, in-band distortion and spectral spreading (or spectral regrowth) may occur. As is known, spectral regrowth may occur when a band-limited time-varying (non-constant) envelope signal is passed through a non-linear circuit. One technique for addressing non-linearity of a power amplifier has operated the power amplifier at a relatively large output power back-off (OBO). Unfortunately, operating a power amplifier at a relatively large OBO (or power de-rating) reduces the power efficiency of the amplifier. For example, at a 6 dB (decibel) OBO, a power amplifier may exhibit a fifty percent (or more) loss in efficiency. To reduce the PAR and/or CM of COFDM systems, various designers have also implemented or proposed hard limiting (or clipping) directly on the signal to be transmitted. Unfortunately, directly clipping the signal to be transmitted may cause undesirable spectral regrowth and inter-user interference (or inter-carrier interference (ICI)) in systems that utilize multiple access mode.

Discrete Fourier transform-spread orthogonal frequency division multiplexing (DFT-SOFDM) has been proposed as the modulation technique for the uplink of evolved-universal terrestrial radio access (E-UTRA). Single carrier transmission schemes, such as DFT-SOFDM, generally facilitate further power de-rating reduction through the use of, for example, specific modulation or coding schemes, or clipping and spectral filtering of a signal to be transmitted. Moreover, the PAR and CM of a basic DFT-SOFDM (or single carrier-frequency division multiple access (SC-FDMA)) system is generally reduced, as compared to the PAR and CM of a basic COFDM system. To further reduce the PAR and CM of basic DFT-SOFDM transmitters, one group of designers has proposed pre-processing an input signal prior to performing a fast Fourier transform (FFT) on a group of symbols associated with the input signal. Following this approach, selected input symbols and/or bits may be attenuated in order to reduce the PAR and CM at the output of an inverse fast Fourier transform (IFFT) of the DFT-SOFDM system.

In general, wireless networks have used an estimated received signal strength and an estimated carrier to interference and noise ratio (CINR) of a received signal to determine operational characteristics of the networks. As one example, IEEE 802.16e compliant mobile stations (MSs) are required to estimate a received signal strength indicator (RSSI) and a CINR of a received signal. In general, CINR at an MS may be calculated as the ratio of an RSSI of a serving base station (BS) to summed RSSIs of non-serving BSs added to a white noise power of a receiver of the MS. The RSSI associated with a serving BS may be used by an MS for uplink power control and the CINR, which is reported to the serving BS, may be used by the serving BS to adapt a downlink transmission rate to link conditions.

Accurate reported CINRs are desirable, as inaccurate reported CINRs may impact performance of a wireless network. For example, reporting a CINR that is above an actual CINR may decrease network throughput due to frame re-transmission, while reporting a CINR that is below the actual CINR may cause the serving BS to schedule data rates below a supportable data rate. According to IEEE 802.16e, RSSI and CINR estimates at an MS are derived based on a preamble signal, which is an orthogonal frequency division multiple access (OFDMA) symbol that is transmitted at the beginning of each OFDMA frame.

Similarly, wireless networks that employ third-generation partnership project long-term evolution (3GPP-LTE) compliant architectures are required to employ uplink reference signals (RSs), which are scheduled to user equipment (subscriber stations (SSs)) within a 3GPP-LTE network. Respective sequences of the RSs are used to uniquely identify an SS and, when transmitted from the SS to a serving base station (BS), may be used by the serving BS in channel characterization. Known channel sounding (channel characterization) approaches have sounded a channel over a relatively long time period, irrespective of geometries of subscriber stations (SSs) with respect to a serving base station (BS). In wireless networks employing known channel sounding approaches, channel sounding bandwidth may consume a relatively large portion of an uplink (UL) channel.

What is needed are techniques for reducing channel sounding bandwidth.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a wireless mobile communication device, it will be appreciated that the present invention is not so limited and that it has application to other embodiments of wireless electronic devices such as personal digital assistants (PDAs), digital cameras, portable storage devices, audio players, computer systems, and portable gaming devices, for example.

As is used herein, the term "user equipment" is synonymous with the term "subscriber station," which is used to denote a wireless device. According to one aspect of the present disclosure, an uplink (UL) channel sounding scheme is employed that generally reduces UL channel sounding resources, e.g., channel sounding bandwidth. The UL channel sounding scheme may enable low-geometry SSs (i.e., SSs with relatively low CINRs) to sound a channel over a longer period of time (e.g., over channel sounding symbols provided in multiple long blocks (LBs)) and high geometry SSs (i.e., SSs with relatively high CINRs) to sound the channel in one LB. As noted above, conventional channel sounding schemes have set a fixed relatively long time period over which all SSs, in communication with a given serving base station (BS), have sounded a channel, i.e., a number of subcarriers over which an SS communicates with the serving BS. In general, when all SSs sound a channel over a fixed relatively long time period (averaging multiple channel sounding symbols), channel sounding bandwidth requirements are relatively large. A geometry of an SS with respect to a serving BS may be determined by, for example, determining a CINR associated with the SS. For example, power-limited subscriber stations (SSs), e.g., SSs that are near a cell-edge, may have a relatively low associated CINR at a serving BS, and thus, be classified as a low geometry SS.

Figure 1:
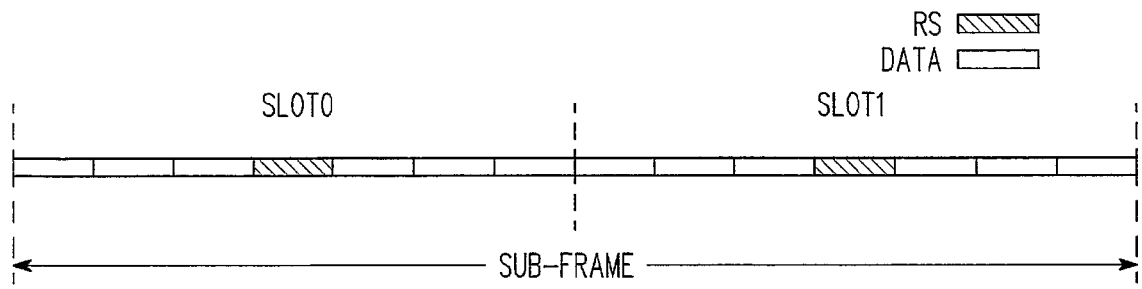
FIG. 1 is a diagram of an example uplink (UL) subframe that includes a demodulation reference signal (RS) positioned in a fourth (middle) symbol of each of two slots.

With reference to FIG. 1, an example uplink (UL) subframe includes a reference signal (RS) positioned in a fourth (middle) symbol of each slot. In the illustrated example, a UL subframe includes two slots, each of which include seven LBs and which encode a symbol. It should be appreciated that the techniques disclosed herein are broadly applicable to UL subframes that employ more or less than the illustrated number of LBs. In the example UL subframe depicted in FIG. 1, the RS in each of slots 0 and 1 are demodulation RSs. According to various embodiments of the present disclosure, channel sounding RSs may be scheduled in any of the LBs in either slot of the UL subframe. According to one or more embodiments, channel sounding symbols scheduled in a same LB of a subframe are configured to be orthogonal when the channel sounding symbols are assigned to same channel (or subchannel). That is, when multiple SSs are scheduled to transmit channel sounding symbols over the same channel (i.e., group of subcarriers), the scheduled channel sounding symbols for each of the multiple SSs are configured as code division multiplexed (CDM) sequences. The CDM sequences may be generated by cyclic shift of one or more base sequences. In general, a length of the cyclic shift may be based on a typical time delay spread associated with the SSs in a cell. For example, in a wireless communication system having a typical time delay spread of five microseconds and a sampling frequency of 7.68 MHZ, a cyclic shift of forty may be employed. The CDM sequences may be, for example, constant amplitude zero autocorrelation (CAZAC) sequences, generated in a number of ways. The generation of the CDM sequences is not particularly relevant to the present disclosure and, as such, is not discussed further herein.

As previously noted, to differentiate SSs (and/or cells), multiple unique RSs are implemented within a wireless communication system. As noted, different RSs usually have different CMs. RSs with relatively high CMs may require output power backoff (OBO) of a power amplifier of an associated SS transmitter to avoid non-linear distortion. As is known, employing OBO in a power amplifier of a transmitter lowers the power efficiency of the power amplifier. Power-limited SSs may be indicated by SSs that are operating at or near maximum transmitter power (e.g., SSs with a transmitter power of 24 dBm (decibels with respect to one milliwatt). According to the present disclosure, bandwidth for channel sounding may usually be reduced by determining respective geometries of multiple SSs with respect to a serving BS. Respective time periods for sounding a channel with a channel sounding symbol (or symbols) is then set based upon the respective geometries of individual SSs with respect to a serving BS. For example, a channel for a high-geometry SS (e.g., an SS with a CINR of about 15 dB) may be characterized based upon the transmission of one channel sounding symbol from the high-geometry SS. As another example, a channel for a low-geometry SS (e.g., an SS with a CINR of about 0 dB) may be characterized based upon the transmission of five channel sounding symbols from the low-geometry SS. As yet another example, a channel for a medium-geometry SS (e.g., an SS with a CINR of about 7.5 dB) may be characterized based upon the transmission of three channel sounding symbols from the medium-geometry SS. In the event that multiple sounding symbols are transmitted from an SS, the serving BS averages the measurements across the multiple channel sounding symbols. It should be appreciated that the CINRs, set forth above, are example CINRs.

In general, a length of an RS ($r_u(n)$) is determined by a length of a discrete Fourier transform (DFT), e.g. a fast Fourier transform (FFT), that is used for the RS (i.e., the number of subcarriers employed). For example, when an RS is assigned one resource block (i.e., twelve subcarriers in the frequency-domain), ten basis sequences may be generated using a cyclic extension approach, i.e., $r_u(n)$, $1 \leq u \leq 10$, $0 \leq n \leq NFFT-1$, where NFFT is the size of the DFT. From each basis, twelve orthogonal sequences may be generated using a cyclic shift in the frequency-domain. An uplink transmitter may implement one of a phase shift keying (PSK), a quadrature amplitude modulation (QAM), or other data modulation scheme, depending upon which modulation scheme is scheduled. It should be appreciated that any of the various PSK, e.g., pi/2 BPSK, QPSK and 8-PSK, or QAM, e.g., 16-QAM and 64-QAM, modulation techniques may be implemented in a wireless communication system constructed according to the present disclosure.

In the disclosed approach, the serving BS initially calculates a CINR of a training signal transmitted from a given SS, during a training sequence, and compares the calculated CINR to one or more thresholds to determine a geometry of the given SS. The training signal may be, for example, a random access preamble or a channel sounding burst. In the event that the given SS is determined to be a low-geometry SS, a channel sounding RS may be assigned, by a scheduler, e.g., a network scheduler, to the SS for transmission multiple times over a relatively long time period. In the event that the SS is later detected to be at a higher geometry, the scheduler may reduce the number of times that the SS is scheduled to transmit the channel sounding RS, in another channel sounding period. The time period over which the SS is scheduled to transmit the channel sounding RS should generally be less than a coherence time of the UL channel (i.e., a time over which the UL channel is stable). Moreover, a bandwidth assigned to the channel sounding RS includes enough subcarriers such that code division multiplexing (CDM) can be employed for the channel sounding RSs transmitted by the SSs (for example, twelve subcarriers are typically required to implement CDM for the UL channel). The channel sounding symbols transmitted by the different SSs should usually be orthogonal, such that multiple SSs can transmit channel sounding RSs simultaneously over the same channel (group of subcarriers) without interference. A serving BS can then receive the respective channel sounding RSs transmitted by respective SSs and accurately determine channel characteristics based on the received channel sounding RSs. For example, for SSs that are relatively close to a serving BS, one channel sounding symbol may generally suffice to provide relatively accurate CINR calculations.

For power-limited SSs (e.g., cell-edge SSs that are transmitting at a power level of about 24 dBm) that are farther from the serving BS, a channel sounding symbol may be scheduled to be transmitted by an SS multiple times within an averaging time period. The serving BS then integrates the received channel sounding symbols to provide relatively accurate CINR calculations. To improve noise and interference estimates, one or more blank cyclic shifts may be employed. That is, certain of the CDM sequences (blank cyclic shifts) may not be assigned to an SS. In this manner, a serving BS may estimate noise and interference based on the decoded blank cyclic shift(s).

Figure 2:
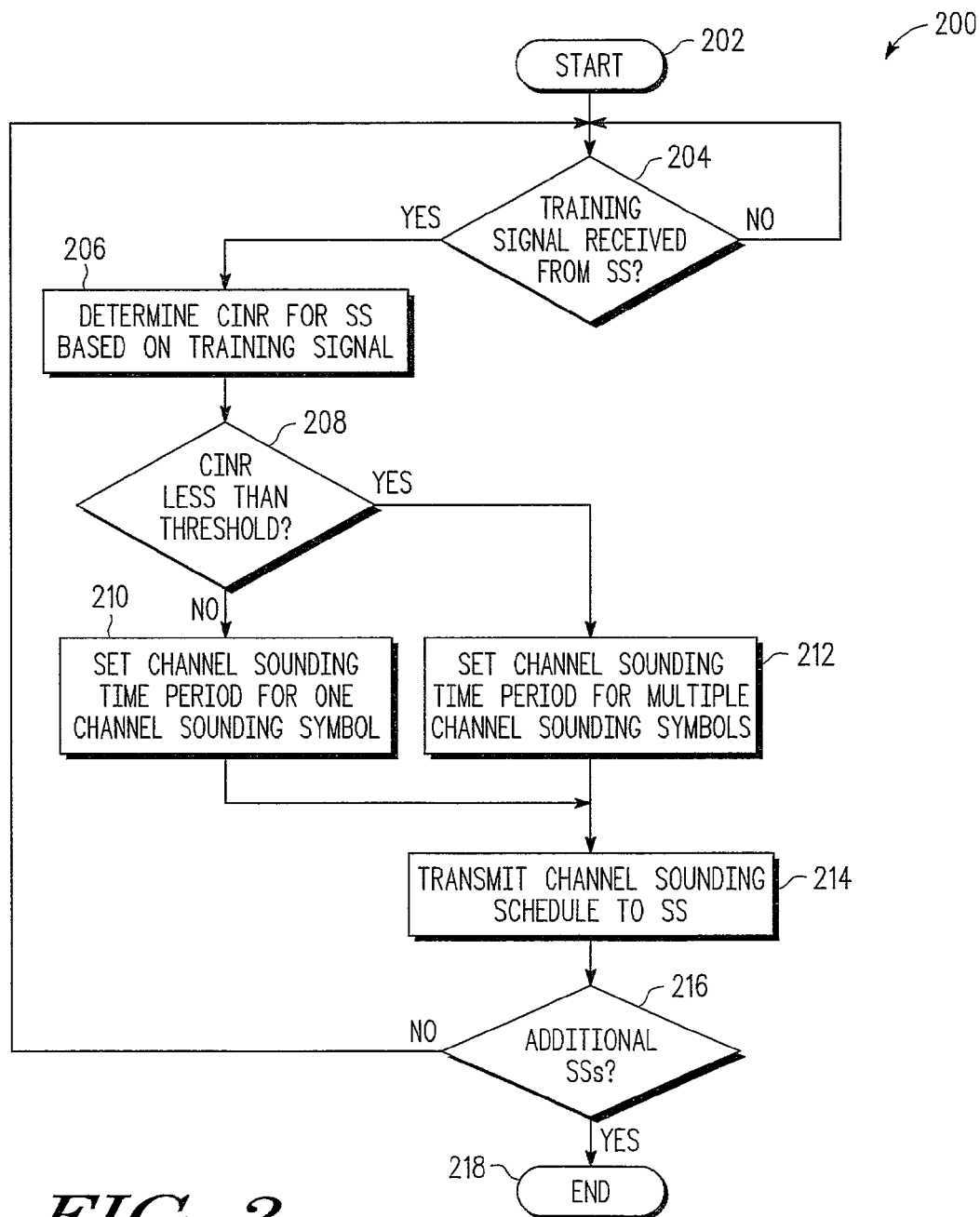
FIG. 2 is a flowchart of a channel sounding assignment process that may be, at least partially, employed in a scheduler in a wireless communication system, according to the present disclosure.

Turning to FIG. 2, a process 200 for determining a channel sounding time period for SSs is depicted. The process 200 may be predominantly employed in a scheduler, e.g., a network-based scheduler, of a wireless communication system. The process 200 is initiated at block 202, at which point control transfers to decision block 204. In block 204, the serving base station (BS) determines whether a training signal has been received from an SS. If a training signal is received in block 204, control transfers to block 206, where a CINR for the SS is determined based on the training signal. If a training signal is not received in block 204, control loops on block 204 until a training signal is received. Following block 206, control transfers to decision block 208 where it is determined, e.g. by a scheduler, whether the CINR is less than a threshold(s). If the CINR of an SS is less than a threshold, control transfers to block 212, where a channel sounding time period for the SS is set for multiple channel sounding symbols. If the CINR of an SS is not less than a threshold, control transfers to block 210, where a channel sounding time period is set for a single channel sounding symbol. In alternative embodiments, multiple thresholds may be employed when determining the number of channel sounding symbols. Following blocks 210 and 212, control transfers to block 214. In block 214, the serving BS transmits the channel sounding schedule to the SS. Next, in decision block 216, it is determined whether additional SSs require training. If so control transfers to block 204. Otherwise, control transfers from block 216 to block 218, where control returns to a calling routine.

A CINR of the received signal may be estimated through a number of approaches. As a first example, U.S. Patent Application Publication No. 2006/0133260 discloses a channel estimation based approach for estimating CINR that isolates noise and interference components using pilot sequences and estimates a channel power by subtracting a combined noise and interference power estimate from a received power estimate. As a second example, U.S. Patent Application Publication No. 2006/0093074 discloses a difference based approach for estimating CINR that assumes that adjacent pilot locations have the same subchannel characteristics. In view of this assumption, noise and interference components are isolated by subtracting adjacent received signals.

Figure 3:
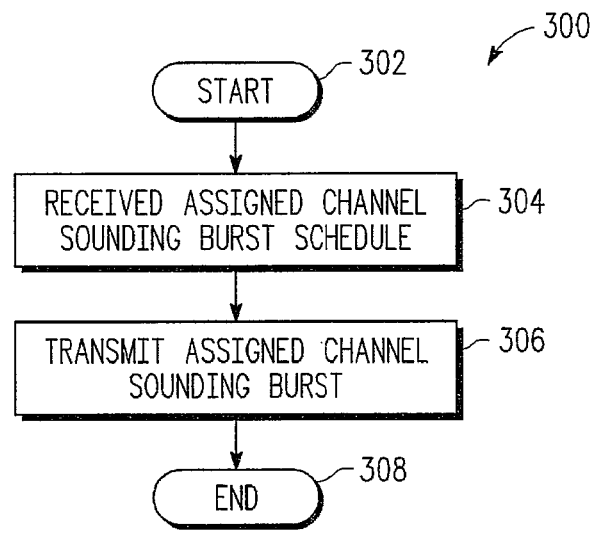
FIG. 3 is a flowchart of a process for receiving and transmitting an assigned channel sounding burst from a given subscriber station (SS) in a wireless communication system, according to the present disclosure.

Moving to FIG. 3, a process 300 for receiving an assigned channel sounding burst schedule and transmitting an assigned channel sounding burst is illustrated. In block 302, the process 300 is initiated, at which point control transfers to block 304. In block 304, an assigned channel sounding burst schedule is received by an SS. Next, in block 306, the assigned channel sounding burst (including one or more channel sounding symbols) is transmitted by the SS. Following block 306, control transfers to block 308, where control returns to a calling routine. In general, providing multiple channel sounding symbols from a low-geometry SS (e.g., a cell-edge SS) allows a serving BS to increase the accuracy of an estimated CINR for the low-geometry SS and, thus, generally improves performance of an associated wireless communication system.

Figure 4:
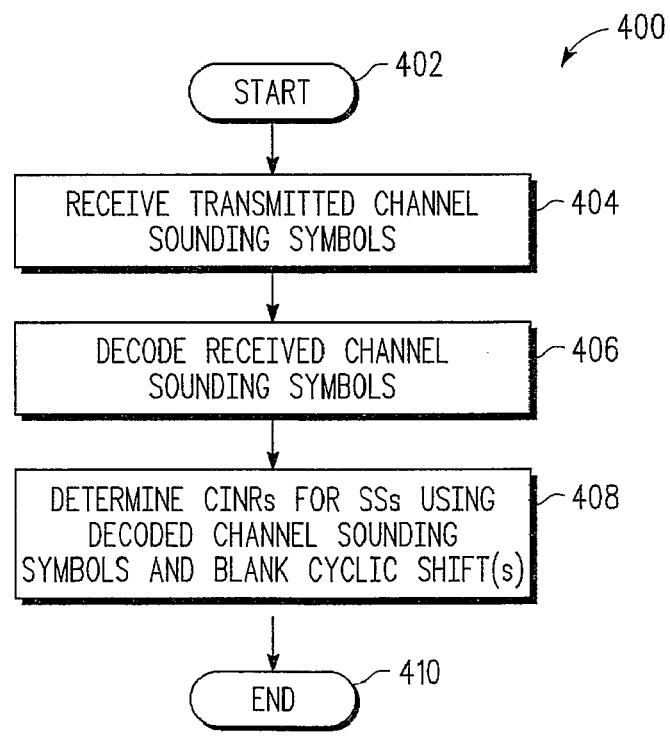
FIG. 4 is a flowchart of a carrier to interference and noise ratio (CINR) determination process that may be employed in base stations (BSs) of a wireless communication system, according to another embodiment of the present disclosure.

Turning to FIG. 4, a CINR determination process 400, that may be employed in a serving BS of a wireless communication system, is depicted. The process 400 may be utilized to determine a CINR of a training signal (or a non-training signal) and is initiated at block 402, at which point control transfers to block 404. In block 404, the serving BS receives transmitted channel sounding symbols from multiple SSs. Next, in block 406, the received channel sounding symbols are decoded. Then, in block 408, CINRs are determined for the SSs using the decoded channel sounding symbols and, for example, one or more blank cyclic shifts. As noted above, a blank cyclic shift is a sequence that was not assigned to an SS for transmission. The blank cyclic shift allows the serving BS to make a determination of the interference and noise (I+N) level on a channel. In general, the interference may be attributed to SSs in adjacent cells and the noise is white noise attributable to a receiver of the serving BS. Next, in block 410, control returns to a calling routine.

Figure 5:
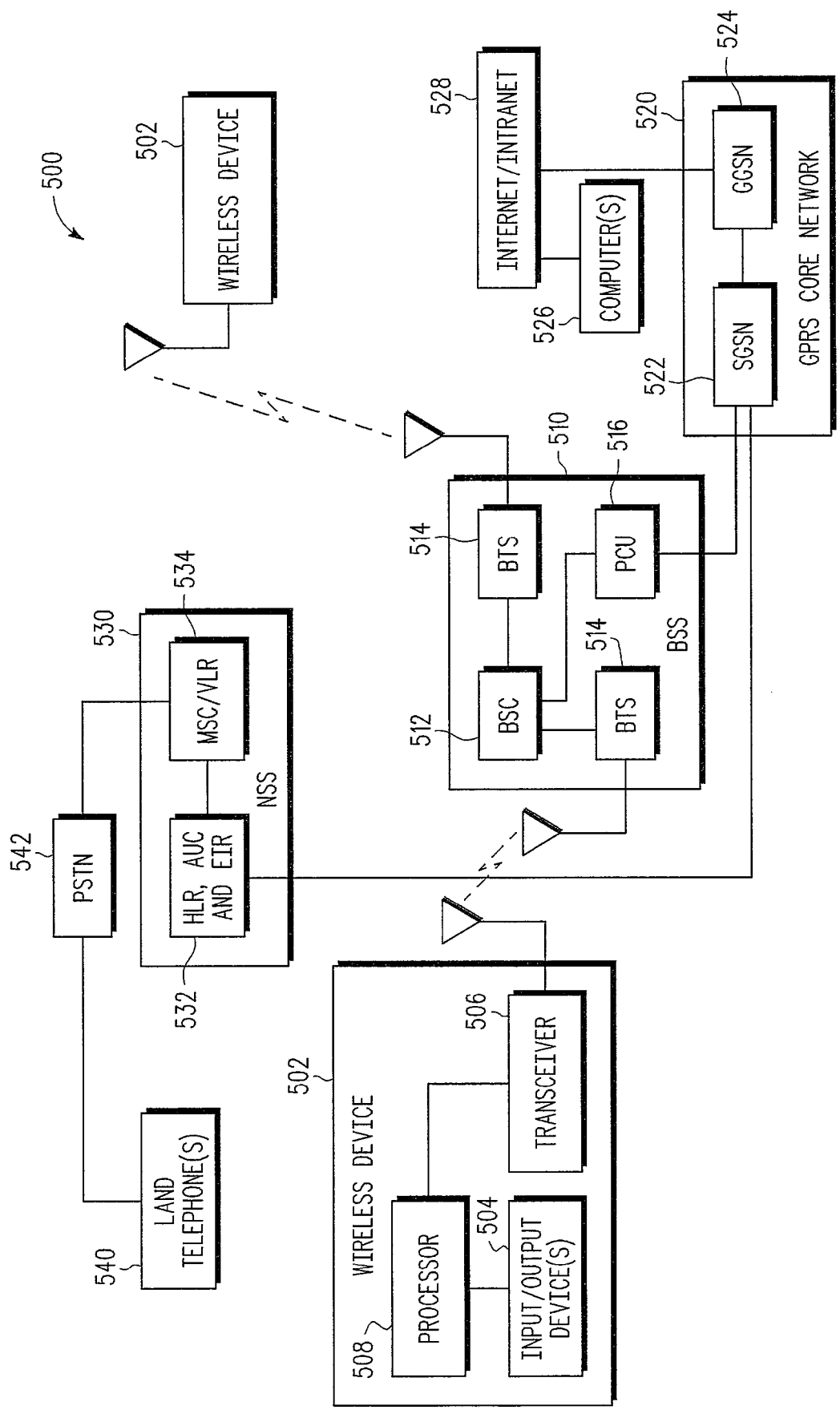
FIG. 5 is a block diagram of an example wireless communication system that may assign channel sounding RSs to SSs according to various embodiments of the present disclosure.

With reference to FIG. 5, an example wireless communication system 500 is depicted that includes a plurality of wireless devices (subscriber stations) 502, e.g., hand-held computers, personal digital assistants (PDAs), cellular telephones, etc., that may implement communication links according to one or more embodiments of the present disclosure. In general, the wireless devices 502 include a processor 508 (e.g., a digital signal processor (DSP)), a transceiver 506, and one or more input/output devices 504 (e.g., a camera, a keypad, display, etc.), among other components not shown in FIG. 5. As is noted above, according to various embodiments of the present disclosure, a technique is disclosed that facilitates channel sounding for a wireless communication device, such as the wireless devices 502. The wireless devices 502 communicate with a base station controller (BSC) 512 of a base station subsystem (BSS) 510, via one or more base transceiver stations (BTS) 514, to receive or transmit voice and/or data. The BSC 512 may, for example, be configured to schedule communications for the wireless devices 502.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the wireless devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSC/VLR) 534, which is in communication with a home location register (HLR), an authentication center (AUC), and an equipment identity register (EIR) 532. In a typical implementation, the MSC/VLR 534 and the HLR, AUC, and EIR 532 are located within a network and switching subsystem (NSS) 530, which may also perform scheduling for the system 500. The SGSN 522 may communicate directly with the HLR, AUC and EIR 532. As is also shown, the MSC/VLR 534 is in communication with a public switched telephone network (PSTN) 542, which facilitates communication between wireless devices 502 and land telephones 540.

Accordingly, a number of techniques have been disclosed herein that generally reduce channel sounding bandwidth in a wireless communication system. While the discussion herein has been primarily directed to improving communications on an uplink of a wireless communication system, it is contemplated that many of the techniques disclosed herein are equally applicable to improving communications on a downlink of a wireless communication system.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, the channel sounding techniques disclosed herein are generally broadly applicable to wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of channel sounding in a wireless communication system, comprising: determining respective geometries of multiple subscriber stations with respect to a serving base station; and setting, based on the respective geometries determining, respective time durations periods for sounding a channel between each of the multiple subscriber stations and the serving base station.

2. The method of claim 1, wherein the setting further comprises:
   setting, based on the determining, a first time duration for sounding the channel between a first subscriber station, included within the multiple subscriber stations, and the serving base station; and
   setting, based on the determining, a second time duration for sounding the channel between a second subscriber station, included within the multiple subscriber stations, and the serving base station, wherein the second time duration is greater than the first time duration and the second subscriber station is located at a lower geometry with respect to the serving base station than the first subscriber station.

3. The method of claim 1, wherein the setting further comprises:
   assigning respective channel sounding burst schedules to the multiple subscriber stations for the channel over respective integration time periods that are less than a coherence time of the channel, wherein a number of subcarriers assigned to the channel is not less than a minimum number for implementing code division multiplexing for the multiple subscriber stations assigned to the channel; and
   communicating, to the multiple subscriber stations, the respective channel sounding burst schedules.

4. The method of claim 1, further comprising:
   transmitting, from the multiple subscriber stations, respective channel sounding bursts on the channel based on the respective channel sounding burst schedules.

5. The method of claim 4, further comprising:
   receiving, at the serving base station, the respective channel sounding bursts from the multiple subscriber stations on the channel; and
   characterizing, for the multiple subscriber stations, the channel based on the received respective channel sounding bursts, wherein the characterizing includes determining a carrier to interference and noise ratio for each of the multiple subscriber stations.

6. The method of claim 5, further comprising:
integrating multiple channel sounding burst symbols, included within the respective channel sounding bursts, over integration time periods that are inversely proportional to the respective geometries of the multiple subscriber stations with respect to the serving base station.

7. The method of claim 4, wherein at least some of the multiple subscriber stations are assigned to a same portion of an uplink subframe of the channel and the transmitting further comprises:
transmitting, from each of the multiple subscriber stations that are assigned to the same portion of the uplink subframe, respective orthogonal channel sounding symbols, included within the respective channel sounding bursts, based on the respective channel sounding burst schedules.

8. The method of claim 7, wherein the respective orthogonal channel sounding symbols are created from a channel sounding reference signal sequence using cyclic shifts.

9. The method of claim 8, wherein one or more blank cyclic shifts are employed in creation of the respective orthogonal channel sounding symbols, and wherein the method further comprises:
determining a carrier to interference and noise ratio associated with each of the multiple subscriber stations based on the one or more blank cyclic shifts and the respective orthogonal channel sounding symbols.

10. The method of claim 1, wherein the respective time durations correspond to one channel sounding symbol for at least a first one of the multiple subscriber stations and to multiple channel sounding symbols for at least a second one of the multiple subscriber stations.

11. A method of channel sounding in a wireless communication system, comprising: receiving, at multiple subscriber stations that are assigned to a same uplink channel, respective channel sounding burst schedules; and transmitting, from the multiple subscriber stations, respective orthogonal channel sounding symbols on the uplink channel based on the respective channel sounding burst schedules, wherein the respective orthogonal channel sounding symbols are created from a channel sounding reference signal sequence using cyclic shifts and include one or more blank cyclic shifts that are not assigned to one of the multiple subscriber stations; determining respective geometries of the multiple subscriber stations with respect to a serving base station; assigning the respective channel sounding burst schedules to each of the multiple subscriber stations for the uplink channel over respective integration time periods that are less than a coherence time of the uplink channel; and communicating, to the multiple subscriber stations, the respective channel sounding burst schedules.

12. The method of claim 11, further comprising: receiving, at the serving base station, the respective orthogonal channel sounding symbols from the multiple subscriber stations on the uplink channel; and characterizing, for the multiple subscriber stations, the uplink channel based on the received respective orthogonal channel sounding symbols, wherein the characterizing includes determining a carrier to interference and noise ratio for each of the multiple subscriber stations.

13. The method of claim 12, further comprising:
integrating the respective orthogonal channel sounding symbols over the respective integration time periods, wherein the respective integration time periods are inversely proportional to the respective geometries of the multiple subscriber stations with respect to the serving base station.

14. The method of claim 13, wherein the respective integration time periods correspond to one channel sounding symbol for at least a first one of the multiple subscriber stations and to multiple channel sounding symbols for at least a second one of the multiple subscriber stations.

15. A wireless communication system, comprising:
a base station configured to determine respective geometries of multiple subscriber stations with respect to the base station; and
a scheduler configured to set respective time durations for sounding a channel between the multiple subscriber stations and the base station based on the respective geometries of the multiple subscriber stations.

16. The wireless communication system of claim 15, wherein the scheduler is further configured to set a first time duration for sounding the channel between a first subscriber station, included within the multiple subscriber stations, and the base station based on a first geometry between the first subscriber station and the base station and set a second time duration for sounding the channel between a second subscriber station, included within the multiple subscriber stations, and the base station based on a second geometry between the second subscriber station and the base station, wherein the second time duration is greater than the first time duration and the second subscriber station is located at a lower geometry with respect to the base station than the first subscriber station.

17. The wireless communication system of claim 15, wherein the base station is further configured to communicate, to the multiple subscriber stations, respective channel sounding burst schedules that include respective orthogonal channel sounding symbols for each of the multiple subscriber stations that are to be transmitted on a same portion of the channel.

18. The wireless communication system of claim 17, wherein the base station is further configured to receive the respective orthogonal channel sounding symbols from the multiple subscriber stations on the channel and characterize, for the multiple subscriber stations, the channel based on the received respective orthogonal channel sounding symbols, and wherein the characterizing includes determining a carrier to interference and noise ratio for each of the multiple subscriber stations.

19. The wireless communication system of claim 17, wherein the respective orthogonal channel sounding symbols are created from a channel sounding reference signal sequence using cyclic shifts and one or more blank cyclic shifts are employed, the base station determining a carrier to interference and noise ratio associated with each of the multiple subscriber stations based on the one or more blank cyclic shifts and the respective orthogonal channel sounding symbols.

* * * * *